2,268,221

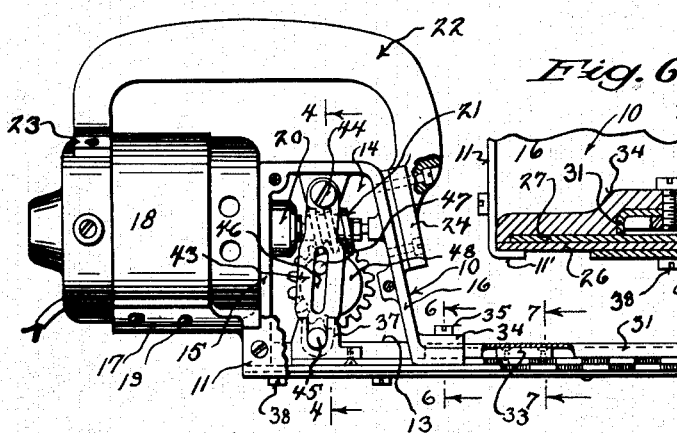
Dec. 30, 1941.  J. S. MISCHKER  2,268,221
HEDGE TRIMMER
Filed April 14, 1941
Inventor
J. S. Mischker
By
Attorneys Patented Dec. 30, 1941

UNITED STATES PATENT OFFICE 2,268,221

HEDGE TRIMMER

John S. Mischker, Milwaukee, Wis.

Application April 14, 1941, Serial No. 388,478

3 Claims. (Cl. 30—228)

This invention appertains to hedge trimmers, and more particularly to a motor-driven hedge trimmer of the type employing a reciprocating toothed blade.

One of the primary objects of my invention is to provide a compact and durable device, which can be manufactured and placed upon the market at a reasonable cost, and which will effectively accomplish the expeditious trimming of hedges.

Another salient object of my invention is to provide novel means for supporting and mounting the blades relative to one another, so that friction between the parts will be reduced to a minimum, and whereby overheating of the parts will be prevented.

A further object of my invention is to provide a motor-driven hedge trimmer in which an electric motor of the ordinary type now found in the open market can be employed, and easily connected to the device to form a direct part thereof.

A still further object of my invention is to provide a manipulating handle for the hedge trimmer connected to the motor and the gear casing for the drive, whereby the device will be thoroughly braced to form a strong, rigid structure.

With these and other objects in view, the invention consists in the novel construction, arrangement, and formation of parts, as will be hereinafter more specifically described, claimed, and illustrated in the accompanying drawing, in which:

Figure 1 is a side, elevational view of my improved device, parts of the view being shown broken away and in section to illustrate structural detail;

Figure 2 is a top plan view of my improved hedge trimmer, with parts thereof broken away and in section;

Figure 3 is a bottom plan view of my hedge trimmer with parts thereof broken away and in section;

Figure 4 is an enlarged, transverse sectional view through the hedge trimmer, taken on the line 4—4 of Figure 1 looking in the direction of the arrows, showing a preferred type of driving mechanism for the reciprocating blade;

Figure 5 is a rear end elevational view of the hedge trimmer, the view being taken substantially on the same scale as Figures 1, 2 and 3;

Figure 6 is a transverse, sectional view through the cutting mechanism, taken on the line 6—6 of Figure 1 looking in the direction of the arrows; and Figure 7 is a view similar to Figure 6, but taken on the line 7—7 of Figure 1.

Figure 8 illustrates a fragmentary view of my preferred form of serrated teeth for the stationary blade.

Referring to the drawing in detail, wherein similar reference characters indicate corresponding parts through the several views, the letter H generally indicates my improved hedge trimmer, and the same includes a gear casing 10 which functions to support the various parts of my apparatus. One side of the gear casing 10 is left open to permit access to be had to the interior thereof, and this open side can be closed by a removable cover plate 11.

By referring to Figures 1 and 4, it can be seen that the gear casing embodies a top wall 12, a bottom wall 13, a side wall 14, a rear wall 15, and a front wall 16. The rear wall 15 has formed thereon and projecting outwardly therefrom, a transversely curved bracket arm 17, which forms a seat for the electric motor 18. The motor 18 can be rigidly fastened to the bracket arm by screws 19.

The front of the casing for the motor is adapted to fit snugly against the rear wall 15 of the casing, and this wall has formed therein an opening for receiving the front bearing 20 of the motor employed for the armature shaft. Hence, the armature shaft extends into the casing, and this shaft has connected therewith a worm 21. The front wall of the casing can also be provided with a bearing for receiving the forward end of the worm or worm shaft.

In order to brace the entire structure and facilitate the manipulation of the trimmer, I provide a special form of handle 22. This handle 22 is of a U-shape, and extends from the outer end of the motor to the extreme front end of the gear casing. The rear end of the handle 22 has formed thereon attaching feet 23 to permit the easy connection of the handle to the casing of the motor by screws. The front end of the handle extends down toward and over the forward or front wall of the gear casing, and has formed thereon a flat attaching foot 24 for engaging the front wall of the gear casing, and, hence, the handle can be easily connected to the gear casing by the use of fastening elements, such as screws.

As the handle 22 connects the motor and gear casing together, the same forms an effective brace for rigidly uniting these parts.

Projecting forwardly from the gear casing is an elongated, longitudinally extending supporting and guard piece 25 for the stationary cutting blade 26 and the reciprocating cutting blade 27. The support and guard for the blades can be made of sheet metal suitably fabricated or folded to provide a flat bottom wall 28, a top wall 29 and a connecting, longitudinally extending side wall 30.

The forward edge of the top wall is turned down to provide a guard flange 31, which terminates over and in slightly spaced relation to the reciprocating top blade 27. The bottom wall 28 extends slightly beyond the flange 31, and the bottom stationary blade 26 fits directly upon the inner surface of the wall 28, and is firmly and detachably fastened thereto by the use of screws 32.

To reduce friction, the upper face of the top reciprocating blade 27 has secured thereto at spaced points bearing blocks 33, which are received within the guide and support 25, as can be clearly seen by referring to Figures 2 and 7. These bearing blocks engage the top wall 29 of the guide and support 25 and the side wall and flange 30 and 31 thereof.

The lower end of the front wall 16 of the gear casing is provided with a forwardly projecting attaching arm 34, and this arm is rigidly fastened to the guide and support 25 by means of a screw 35. This screw extends through the arm 34, the top wall of the guide and support 25, and into a nut and spacer 36 disposed in the guide and support 25.

The rear ends of the blades 26 and 27 extend under the gear casing, and the top wall of the guide and support 25 is cut away to permit the bottom wall 28 of the guide and support to extend under the casing with the blades. The top blade 27 is cut away at this point, and carries a bearing block 37, which forms a part of the drive for the reciprocating blade, as will be later set forth.

The lower blade is also firmly connected to the gear casing by spaced screws 38, which extend into the lower wall of the gear casing through the lower wall of the guide and support 25, and said stationary blade 26. The lower edge of the cover plate 11 of the gear casing 10 has also formed thereon an inturned flange 11', which extends under and engages the stationary blade 26.

The blades 26 and 27 have formed thereon a plurality of V-shaped cutting teeth 39, and these teeth project laterally from the blades at one side of the guide and support 25. The teeth 39 for the stationary blade 26 have their sharpened side edges notched as at 40, to catch the branches of the hedge being trimmed, and to prevent the branches from slipping out between the teeth during the cutting operation.

Attention is called to Figures 2 and 3, and it will be noted that the outer end of the blade 26 has formed thereon a notched cutting spur 41, while the forward end of the blade 27 is provided with a cutting edge 42, and relatively heavy branches can easily be cut between the cutting barb 41 and the edge 42.

Obviously, under certain conditions as a substitute for the relative reciprocating end spurs 41 and 42, I may attach an independent crank blade to the spur 41 and connect the same to the reciprocated spur 42 or cutting blade, whereby the reciprocating blade and associated spur will operate similar to a pair of shears.

The driving mechanism for the movable blade 27 includes the swinging lever 43 rockably mounted at its upper end upon a pivoted stud 44 carried by the gear casing. The lower end of the swinging or oscillating lever 43 has formed thereon or secured thereto a drive pin 45, which is received in the bearing knuckle 37 carried by the inner end of the movable blade.

Intermediate the ends of the lever, a slot 46 is formed which receives the eccentric drive pin 47 carried by the worm wheel 48, which meshes with the worm 21 on the armature shaft of the motor. The worm wheel 48 is suitably mounted upon a supporting shaft 49 mounted in a bearing 50 formed on the gear casing 10.

From the foregoing description, it can be seen that when the electric circuit is closed through the motor 18, the lever 43 will be swung back and forth, and this will impart the desired rapid movement to the movable reciprocating blade 27.

Great stress is laid upon the simplicity of my hedge trimmer and the novel means employed for mounting and guiding the plates on the gear casing.

Changes in details may be made without departing from the spirit or the scope of my invention, but what I claim as new is:

1. A portable, power-driven hedge trimmer comprising, a gear casing, a motor connected to the gear casing, a manipulating handle connecting the gear casing and motor, a forwardly projecting blade support and guide secured to the gear casing including a bottom wall, a spaced top wall, and a connecting side wall, a depending guide flange formed on the forward edge of the top wall, a stationary cutting blade rigidly secured to the bottom wall, a movable blade mounted upon the stationary blade and extending into the gear casing, means in said gear casing for reciprocating the movable blade from the motor, and spaced bearing and guide blocks rigidly secured to the movable blade and slidably mounted in the guide and blade support, said bearing and guide blocks engaging the top wall, flange, and side wall of said guide and blade support.

2. A portable, power-driven hedge trimmer comprising, a gear casing having one side open, a removable cover plate for closing said open side, a forwardly projecting attaching arm on said gear casing, a rearwardly projecting supporting bracket on said gear casing, an electric motor rigidly secured to the bracket and fitted against the rear wall of the gear casing, and including an armature shaft extending into the gear casing, a manipulating handle rigidly secured at its rear end to the rear end of the motor and at its forward end to the front of said gear casing, a guide and blade support rigidly secured to the arm, a stationary blade secured to the guide and blade support, a reciprocating blade mounted upon the stationary blade and carried by said guide and blade support and having its inner end extending into the gear casing, and a drive mechanism in said gear casing operatively connecting the armature shaft to the inner end of said reciprocating blade.

3. A portable, power-driven hedge trimmer comprising, a gear casing having one side open, a removable cover plate for closing said open side, a forwardly projecting attaching arm on said gear casing, a rearwardly projecting supporting bracket on said gear casing, an electric motor rigidly secured to the bracket and fitted against the rear wall of the gear casing, and including an armature shaft extending into the gear casing, a manipulating handle rigidly secured at its rear end to the rear end of the motor and at its forward end to the front of said gear casing, a guide and blade support rigidly secured to the arm, a stationary blade secured to the guide and blade support, a reciprocating blade mounted upon the stationary blade and carried by said guide and blade support and having its inner end extending into the gear casing, a drive mechanism in said gear casing operatively connecting the armature shaft to the inner end of said reciprocating blade, said guide and blade support including a bottom wall, a top wall, and a connecting side wall, the inner end of the bottom wall being extended under the gear casing, means rigidly securing the bottom wall and stationary blade to the gear casing, and an inturned flange on the cover plate extending under and engaging the outer edge of the stationary blade at the rear end thereof.

JOHN S. MISCHKER.